United States Patent
Partington et al.

(10) Patent No.: US 9,779,400 B2
(45) Date of Patent: *Oct. 3, 2017

(54) BIOMETRIC MATCHING SYSTEM USING INPUT BIOMETRIC SAMPLE

(71) Applicant: Accenture Global Services Limited, Dublin (IE)

(72) Inventors: Alastair Ross Partington, Hatfield (GB); Alessio Cavallini, Nice (FR); Cyrille Bataller, Mougins (FR)

(73) Assignee: Accenture Global Services Limited, Dublin (IE)

( * ) Notice: Subject to any disclaimer, the term of this patent is extended or adjusted under 35 U.S.C. 154(b) by 231 days.

This patent is subject to a terminal disclaimer.

(21) Appl. No.: 14/720,127

(22) Filed: May 22, 2015

(65) Prior Publication Data

US 2015/0278812 A1    Oct. 1, 2015

Related U.S. Application Data

(63) Continuation of application No. 13/644,117, filed on Oct. 3, 2012, now Pat. No. 9,069,997.

(30) Foreign Application Priority Data

Oct. 18, 2011   (EP) ...................................... 11306347

(51) Int. Cl.
   *G08B 21/00*   (2006.01)
   *G06Q 20/40*   (2012.01)
   (Continued)

(52) U.S. Cl.
   CPC .............. *G06Q 20/40* (2013.01); *G06K 9/00* (2013.01); *G06K 9/00892* (2013.01); *G06K 9/00973* (2013.01); *G06Q 20/102* (2013.01)

(58) Field of Classification Search
   CPC ....... G06K 9/00973; G06K 9/00; G06F 17/30
   (Continued)

(56) References Cited

U.S. PATENT DOCUMENTS 5,224,173 A    6/1993 Kuhns
6,898,299 B1   5/2005 Brooks
(Continued)

OTHER PUBLICATIONS

Hiromoto et al., "Partially Parallel Architecture for AdaBoost-Based Detection with Haar-Like Features", IEEE Transactions on Circuits and Systems for Video Technology, vol. 19, No. 1, Jan. 2009, pp. 41-52.
European Search Report corresponding to EP11306279, dated Mar. 16, 2012, 2 pages.
European Search Report corresponding to EP11306280, dated Mar. 22, 2012, 2 pages.
(Continued)

*Primary Examiner* — Mark Rushing
(74) *Attorney, Agent, or Firm* — Harrity & Harrity, LLP (57) ABSTRACT

The present disclosure concerns a method of identifying a biometric record of an individual in a database comprising a plurality of biometric records, each record comprising at least one reference biometric sample, the method comprising: receiving, by a biometric identification unit (202), an input biometric sample with associated source information; selecting, by the biometric identification unit using a reference table (210), and based on said source information a matching process; and applying by said biometric identification unit said selected matching process to at least some of said biometric records of said database to determine whether said input biometric sample matches a reference biometric sample of one of said biometric records.

20 Claims, 4 Drawing Sheets

(51) Int. Cl.
*G06K 9/00* (2006.01)
*G06Q 20/10* (2012.01)

(58) Field of Classification Search
USPC ........................................................ 340/5.82
See application file for complete search history.

(56) References Cited

U.S. PATENT DOCUMENTS

| | | |
|---|---|---|
| 2002/0091937 A1 | 7/2002 | Ortiz |
| 2003/0149882 A1 | 8/2003 | Hamid |
| 2005/0238214 A1 | 10/2005 | Matsuda et al. |
| 2006/0104485 A1 | 5/2006 | Miller, Jr. |
| 2011/0211735 A1 | 9/2011 | Langley |
| 2012/0042171 A1 | 2/2012 | White et al. |
| 2013/0093565 A1 | 4/2013 | Partington et al. |

OTHER PUBLICATIONS

European Search Report corresponding to EP11306347, dated Jan. 30, 2012, 3 pages.

Hong et al., "Integrating Faces and Fingerprints for Personal Identification", IEEE Transactions on Pattern Analysis and Machine Intelligence, IEEE Service Center, vol. 20, No. 12, Dec. 1, 1998, pp. 1295-1307.

Jain et al., "Chapter 2 (part): Fingerprint Feature Processing Techniques and Poroscopy in: Intelligent Biometric Techniques in Fingerprint and Face Recognition", Jan. 1, 1999, Intelligent Biometric Techniques in Fingerprint and Face Recognition, CRC Press, pp. 56-60.

Jain et al., "Handbook of Biometrics", 2008, Springer Science, pp. 12-14.

Jain et al., "Biometrics: Personal Identification in Networked Society", 1999, Kluwer Academic Press, pp. 18-20, 51, 60, and 61.

| 302 | 304 | 306 | 308 | 310 | 312 |
|---|---|---|---|---|---|
| REF | PHOTO OF FACE | FINGER PRINT | IRIS SCAN | SIGNATURE | REGISTERED SOURCE(S) |
| 0001 | image 1A | | image 1C | image 1D | A |
| 0002 | image 2A | image 2B | | image 2D | A+B |
| 0003 | | image 3B | image 3C | image 3D | B |

| IMAGE REF | AGE | GENDER | IMAGE SIZE | SHARPNESS | VIEWING ANGLE | CONTRAST | QUALITY SCORE |
|---|---|---|---|---|---|---|---|
| image 1A | 66 | M | 1200 x 1600 | 8 | 5° | 11 | 9 |
| image 1B | 66 | M | 240 x 360 | 9 | — | 8 | 8 |
| image 2A | 13 | F | 600 x 800 | 6 | -10° | 15 | 5 |

Fig 8B

| IMAGE REF | IMAGE SIZE | SHARPNESS | VIEWING ANGLE | QUALITY SCORE |
|---|---|---|---|---|
| input 1A | 600 x 800 | 7 | 5° | 8 |
| input 2B | 240 x 360 | 7 | 0° | 6 |

BIOMETRIC MATCHING SYSTEM USING INPUT BIOMETRIC SAMPLE

RELATED APPLICATIONS

This application is a continuation of U.S. patent application Ser. No. 13/644,117, filed Oct. 3, 2012 the disclosure of which is incorporated by reference herein in its entirety.

The present application is related to co-pending U.S. patent application Ser. No. 13/644,056, filed Oct. 3, 2012, (now U.S. Pat. No. 8,832,124) entitled "BIOMETRIC MATCHING ENGINE" and U.S. patent application Ser. No. 13/644,090, filed Oct. 3, 2012, (now U.S. Pat. No. 9,053,374) entitled "BIOMETRIC TRAINING AND MATCHING ENGINE".

FIELD

The present disclosure relates to identifying a record in a biometric database based on an input biometric sample.

BACKGROUND

The use of biometric data for the identification of individuals is increasingly becoming the preferred choice in many environments due to the relative difficulty in fraudulently replicating the data. For example, due to increasing fraud involving payment cards such as credit cards, it has been proposed to use biometric data, such as for example fingerprints, to identify customers in shops or supermarkets to allow a payment transaction to be initiated. As a further example, biometric data is increasing used for identifying individuals authorized to enter restricted areas, such as, for example, gyms, apartment blocks or vehicles, or to pass through a border control. Furthermore, criminal databases have long been used for identifying individuals based on biometric data, such as, for example, a fingerprint or facial image taken at a crime scene.

To identify individuals, a biometric sample is obtained and compared to the records of a database, until a match is found. In the majority of applications, speed is of the essence. For example, if a user is at the checkout of a supermarket, or at a border control gate, an identification delay of more than several seconds may be considered unacceptable. A further requirement is that there are very few errors, i.e. very few false positive and false negative results. Indeed, if a customer at the checkout of a supermarket can not be identified, or is wrongly identified, this could lead to the customer being unable to make the payment, or to the wrong person being billed.

However, there is at least one technical problem in increasing the speed of identification and/or in reducing the error rate in current biometric identification systems.

SUMMARY

It is an aim of embodiments of the present disclosure to at least partially address one or more problems in the prior art.

According to one aspect, there is provided a method of identifying a biometric record of an individual in a database comprising a plurality of biometric records, each record comprising at least one reference biometric sample, the method comprising: receiving, by a biometric identification unit, an input biometric sample with associated source information; selecting, by the biometric identification unit using a reference table, and based on said source information a matching process; and applying by said biometric identification unit said selected matching process to at least some of said biometric records of said database to determine whether said input biometric sample matches a reference biometric sample of one of said biometric records. For example, selecting the matching process comprises selecting the matching process to be applied to each of said at least some biometric records of the database.

According to one embodiment, selecting said matching process comprises at least selecting a filtering threshold used for eliminating records of said database.

According to another embodiment, the method further comprises assigning an amount of processing resources to said matching process based on said source information, the amount of processing resources determining the processing time of said matching process.

According to another embodiment, the method further comprises, prior to applying said selected matching process, selecting, based on said source information, records of said database to which said matching process is to be applied.

According to another embodiment, the method further comprises extracting a quality value from said input biometric sample, wherein a filtering threshold for eliminating records during said selected matching process is selected based on said quality value.

According to another embodiment, selecting the matching process comprises either: selecting a filtering algorithm used for eliminating records of said database; or selecting a filtering threshold used for eliminating records of said database; or selecting the type of biometric sample used for eliminating records of said database; or selecting the amount of processing resources to be used for eliminating records from said database; or a combination of any of the above.

According to another embodiment, the method further comprises initiating by said biometric identification unit an electronic payment based on a result of said matching process.

According to another embodiment, the method further comprises, prior to receiving said input biometric sample, enrolling said individual by adding a new record containing at least one reference biometric sample of said individual to said database.

According to another embodiment, the method further comprises associating in said database said new record with at least two source apparatuses.

According to a further aspect, there is provided a biometric identification system comprising: a database comprising a plurality of biometric records, each record comprising at least one reference biometric sample; an input for receiving an input biometric sample with associated source information; and a biometric identification unit configured to: select, using a reference table and based on said source information a matching process; and apply said selected matching process to said biometric records of said database to determine whether said input biometric sample matches a reference biometric sample of one of said biometric records.

According to one embodiment, said input is in communication with at least two remote source apparatuses each comprising a biometric capturing device.

According to another embodiment, each of said at least two source apparatuses is either: a merchant payment terminal; or an entry system to a restricted area; or a border control gate; or a combination of any of the above.

According to another embodiment, said biometric identification unit is configured to apply said selected matching process to the records of said database that are associated with one of said source apparatuses as indicated by said source information.

According to another embodiment, the system further comprises a lookup table indicating a link between each record of said database and payment account details.

According to another embodiment, said payment account details include payment information to enable a payment to be initiated.

The details of various embodiments are set forth in the accompanying drawings and the description below. Other potential features will become apparent from the description, the drawings and the claims.

BRIEF DESCRIPTION OF THE DRAWINGS

The foregoing and other purposes, features and aspects of the disclosure will become apparent from the following detailed description of example embodiments, given by way of illustration and not limitation with reference to the accompanying drawings, in which.

Throughout the figures, like features have been labelled with like reference numerals.

DETAILED DESCRIPTION

Figure 1:
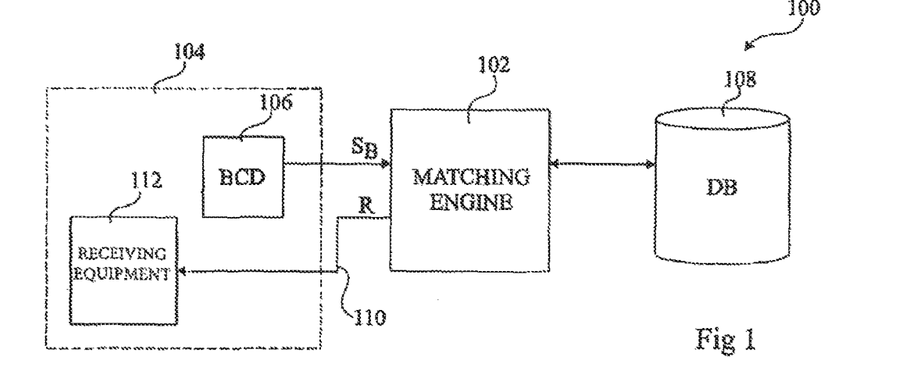
FIG. 1 schematically illustrates a biometric identification system.

FIG. 1 illustrates a biometric identification system 100 comprising a matching engine 102 for identifying a record matching an input biometric sample from a single source apparatus 104. As used herein, "source apparatus" designates one or more devices that provide biometric samples and allow access to products, to a restricted area, or to other type of services, if an authorized record holder is identified. For example, the source apparatus 104 could correspond to a cashier terminal in a supermarket, or an entry barrier at an airport lounge.

Matching engine 102 receives a biometric input sample $S_B$ from a biometric capturing device (BCD) 106 of the source apparatus 104. The biometric capturing device 106 is for example a visible light or infra-red camera, a fingerprint sensor, microphone or any other detector suitable for capturing a biometric sample of an individual. Input biometric sample $S_B$ could for example be a photo of the face, a fingerprint, an iris scan, an image of a signature, a finger vein or palm vein image, a voice sample, or any other form of biometric data.

In some cases the individual is present at the capturing device 106 and submits the biometric input sample, for example by presenting their face to a camera or placing a finger on a fingerprint detector. In other cases, the biometric data may be retrieved from another source, such as from the scene of a crime in the case of a fingerprint, or from a surveillance video image.

Engine 102 has access to a biometric database (DB) 108 storing biometric records each associated with one or more reference biometric samples. A biometric sample is defined herein as data in the form of an image and/or biometric template based on the image, representing biometric data of an individual. Engine 102 searches the biometric database for a record having a reference biometric sample matching the input biometric sample. A result R is provided on an output 110 to receiving equipment 112 of the source apparatus 104. The result R for example simply indicates whether or not a match was found, or may also contain data associated with the matching record, such as a reference number of the matching record, the identity, such as name, of the individual associated with the matching record, or other data. The receiving equipment 112 is for example any equipment that reacts to the result R of the matching process to provide or deny access to one or more products, restricted areas or services.

The matching engine 102 of the biometric identification system 100 of FIG. 1 is programmed to apply certain matching processes in order to provide the result R within a certain time delay and with a desired accuracy, in other words with a given percentage of false positive or false negative matches. However, the time delay and accuracy requirements may change, and the accuracy of the matching engine 102 may evolve in time due for example to a degradation of the biometric capturing device 106.

Figure 2A:
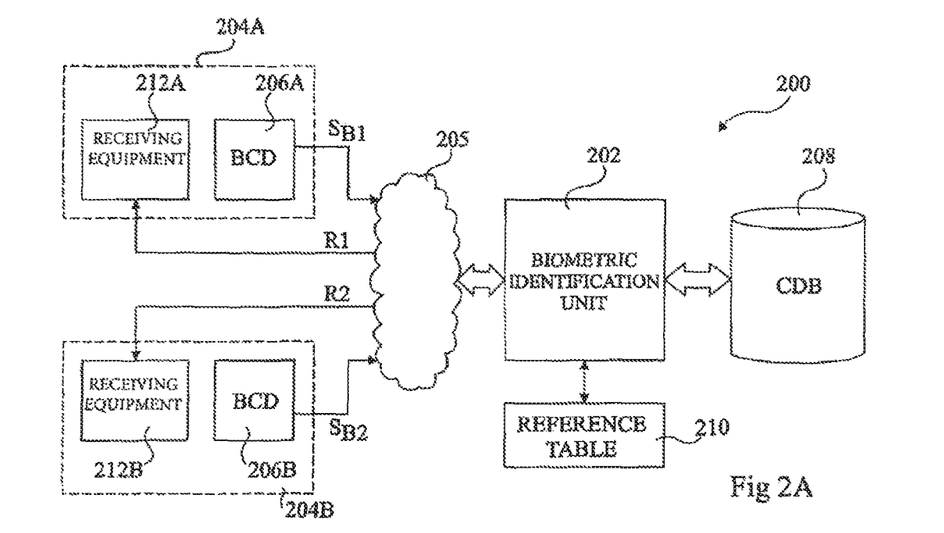
FIG. 2A schematically illustrates a biometric identification system according to an example embodiment.

FIG. 2A illustrates an alternative biometric identification system 200 comprising a biometric identification unit 102 for identifying a record matching an input biometric sample from two different source apparatuses 204A and 204B, via a communications channel 205. In alternative embodiments there may be more than two source apparatuses. Communications channel 205 could for example be a wired and/or wireless connection comprising a local area network (LAN), a metropolitan data network (MAN), wide area network (WAN) and/or the internet. Thus the biometric identification unit 202 provides a centralized identification service for a plurality of source apparatuses/clients. Such an arrangement may for example be referred to as an "in the cloud" approach.

The source apparatuses 204A, 204B comprise biometric capturing devices 206A, 206B respectively, which provide respective input biometric samples $S_{B1}$ and $S_{B2}$ to the biometric identification unit 202. While each source apparatus 204A, 204B has been illustrated with a single capturing device 206A, 206B, each may comprise one or more additional biometric capturing devices, which for example allow a matching record to be identified based on more than one biometric sample.

The biometric identification unit 202 has access to a common database (CDB) 208, which stores biometric records for both the users registered to access the products of services offered by source apparatus 204A and those registered to access the products or services offered by source apparatus 204B. As will be explained in more detail below, there may be some overlap, meaning that some users may be registered to use both apparatuses 204A, 204B.

The biometric identification unit 202 also has access to a reference table 210, which for example indicates which matching process is to be used for requests originating from each of the source apparatuses 204A, 204B, and may also indicate the level of service to be offered, in terms of speed and/or accuracy.

For example, each of the entities associates with the source apparatuses 204A, 204B pays for a certain level of service, such that the input biometric samples submitted by their respective capturing devices 206A, 206B for identification are processed with a certain accuracy and/or at a certain speed. In some cases, the cost may also be based on the number of records that must be searched, and/or the quality of the biometric samples provided by the capturing devices 206A, 206B. The quality of a sample may be defined in any of a number of ways, such as by the sharpness, contrast or size of an image, as will be described in more detail below with reference to FIGS. 8A and 8B.

As one example, the source equipment 204A could correspond to a border control gate that automatically identifies individuals based on a facial image. As such, it may be desirable that the matching process has very few false positive matches, and is performed very quickly on a very large number of potentially matching records. The source equipment 204B is for example a cashier terminal at a point of sale in a shop or supermarket, allowing customers to use a fingerprint detector to initiate a payment for their purchases. There may be relatively few customers registered with this payment service, and thus few records may have to be searched, and a longer matching delay may be permissible when compared to the requirements in the border control example. Thus the reference table 210 for example indicates that, for biometric samples originating from source apparatus 204A, a high level of processing resources/priority is to be applied in order to achieve a fast result, and a matching process is to be used that results in very few false positives. On the other hand, the reference table may indicate that relatively low level of processing resources/priority is to be applied to records originating from source apparatus 204B, and but that a matching process with very few false positive and false negative results is to be applied.

The results R1 and R2 from the matching processes applied to the input biometric samples $S_{B1}$ and $S_{B2}$ respectively are provided to corresponding receiving equipment 212A, 212B of the source apparatus 204A, 204B respectively.

The matching process used for identifying a matching biometric record in the biometric database 208 may comprise one or more matching operations. A matching operation is one that compares an input biometric sample to at least one reference biometric sample of one or more records in the biometric databases in order to determine a similarity score that is used to identify a matching record.

Figure 2B:
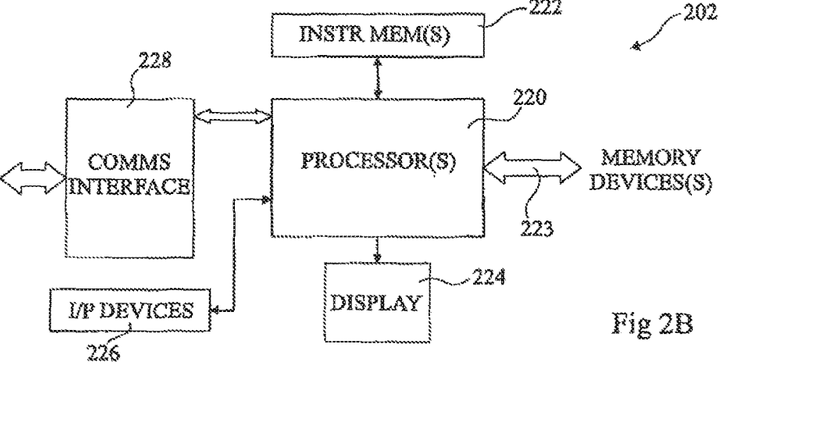
FIG. 2B schematically illustrates a biometric identification unit of FIG. 2A in more detail according to an example embodiment.

FIG. 2B illustrates the biometric identification unit 202 of FIG. 2A in more detail according to one example. As illustrated, the unit 202 comprises one or more processors 220 that may operate in parallel under the control of one or more instruction memories 222. The processors 220 may comprise one or more microprocessors, microcontrollers, digital signal processors, or appropriate combinations thereof, and executes instructions stored in the instruction memory or memories 222, which could be a volatile memory such as a DRAM (dynamic random access memory), or another type of memory.

The processors 220 are also in communication via an interface 223 with one or more memory devices, for example comprising non-volatile memories, such as hard disk drives or FLASH drives (not illustrated in FIG. 2B) that store the common biometric database 208, reference table 210, and may also store other databases described in more detail below.

A display 224, as well as one or more input devices 226 such as a keyboard or mouse, may be provided for allowing an administrator to control the operations of the biometric identification unit 202, for example to download software updates, etc.

A communications interface 228 for example provides a connection to the source apparatuses 204A, 204B, and in particular to the biometric capturing devices 206A, 206B and receiving devices 212A, 212B, via the communications channel 205 described above.

Figure 3:
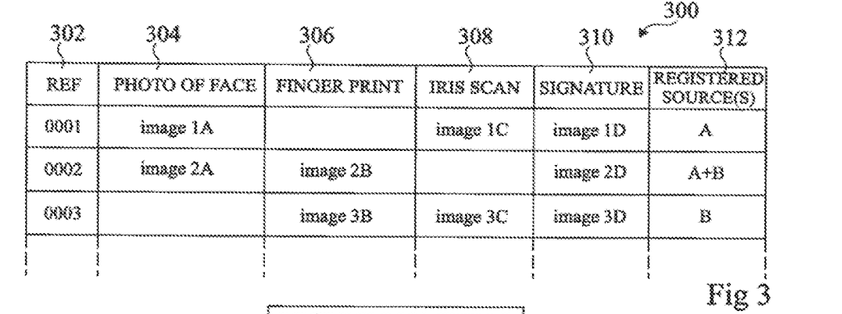
FIG. 3 illustrates a portion of a biometric database according to an example embodiment.

FIG. 3 illustrates a portion of the common biometric database 208 of FIG. 2A, storing biometric records according to an example embodiment. Each record of the database corresponds to a different individual. The particular record holders of the records stored in the database 208 will depend on with source apparatus 204A, 204B they are registered with, and could correspond to members of a gym, customers of a shop or supermarket, employees of an office, travellers wishing to cross a border, or other types of record holders.

In FIG. 3, three biometric records are shown as an example, having references "0001", "0002" and "0003" respectively indicated in a field 302. Of course in practise the database is likely to contain hundreds or thousands of records. Each biometric record is associated with a corresponding record holder, but for security reasons, the database 208 for example only identifies these individuals by a reference number. A separate table, for example stored by the biometric identification unit 202, may indicate the mapping between the reference numbers of field 302 and biographic information of the corresponding record holder, such as name, address, account details etc., depending on the application.

A field 304 for example comprises a digital image of the face of the record holder, a field 306 for example comprises a digital image of the fingerprint of the record holder, a field 308 for example comprises a digital image of an iris scan of the record holder, and a field 310 for example comprises a digital image of the signature of the record holder. Fields 304, 306, 308 and 310 may additionally or alternatively store biometric templates, generated based on the corresponding images. Of course, in alternative examples of the biometric database 208, only some of these fields may be present and/or addition fields comprising other biometric data could be included.

In the example of FIG. 3, not all records comprise a sample in each field 304 to 310. For example, some of the record holders may not have provided some of the reference samples. In particular, only records 0001 and 0002 comprise images of the face of the record holder in field 304, labelled "image1A" and "image 2A" respectively. Furthermore, only records 0002 and 0003 comprise fingerprint images in field 306, labelled "image2B" and "image3B" respectively, and only records 0001 and 0003 comprise iris scan images in field 308, labelled "image1C" and "image3C" respectively. All three records comprise signature images in field 310, labelled "image1D", "image2D" and "image3D" respectively.

A field 312 for example indicates which source apparatuses the record holder is registered to use. In the example of FIG. 3, the record holders of records "0001" and "0003"

are registered with source apparatuses A and B respectively, which correspond to the source apparatuses 204A and 204B in FIG. 2A respectively. The record holder of record "0002" is registered with both source apparatuses A and B.

While in FIG. 3 an example of the common biometric database 208 is illustrated in which a single group of records contains those of record holders registered with each of the source apparatuses 204A, 204B, in alternative embodiments, the common database 208 could be partitioned such that there is a separate portion of the database corresponding to each source apparatus, and users registered with more than one source apparatus appear in each corresponding database partition.

Figure 4:
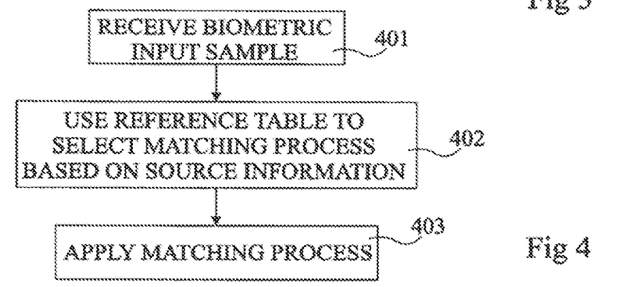
FIG. 4 is a flow diagram illustrating operations in a method of identifying a biometric record according to an example embodiment.

FIG. 4 is a flow diagram illustrating operations in a method of identifying a biometric record according to an example embodiment.

In an operation 401, a biometric input sample is received from one of the biometric capturing devices 206A, 206B of source apparatuses 204A, 204B. The input biometric sample is for example transmitted along with source information indicating from which of the source apparatuses 204A, 204B it originates.

In a subsequent operation 402, the reference table 210 of FIG. 2B is used to identify and select, based on the source information, at least the particular matching process to be applied to the input biometric sample. This operation may also involve determining from the reference table 210 the processing resources to be assigned to this matching task. The processing resources may be inherently defined by the matching process that has been selected, as a function of the particular matching operations to be applied. Alternatively or additionally, a priority level and/or a given number of processors is/are assigned to the particular matching task, based on the source information. For example, the processor block 220 of FIG. 2B comprises multiple processors and one or more of these processors may be assigned to each matching process. Furthermore, the processor time of the one or more of the processors 220 is for example shared between the matching tasks to be performed, and the higher the priority, the greater the duration of the timeslots that are allocated to the corresponding task.

In a next operation 403, the selected matching process is applied to identify, among the records of the common database associated with the source apparatus, a record having a reference biometric sample matching the input biometric sample.

Figure 5:
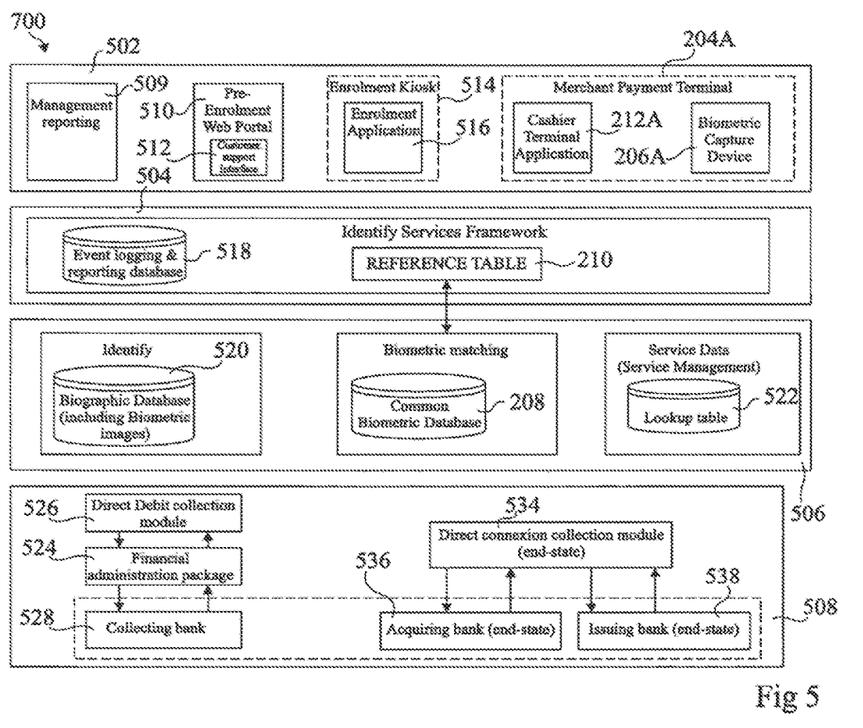
FIG. 5 schematically illustrates the biometric identification system of FIG. 2A in more detail according to an example embodiment.

FIG. 5 schematically illustrates the biometric identification system 200 of FIG. 2A in more detail according to one particular example.

In FIG. 5, the biometric identification system 200 comprises remote apparatus 502, an identity services framework module 504, memory banks 506, and a payment module 508.

The remote apparatus 502 includes the source apparatus 204A, which in this example is a merchant payment terminal comprising the biometric capture device 206A and a cashier terminal application implementing the receiving equipment 212A. The source apparatus 204B (not illustrated in FIG. 5) is for example of the same type, but corresponds to a different merchant. The remote apparatus 502 also comprises a management reporting module 509, which for example generates performance statistics, a pre-enrolment web portal 510 implementing a customer support interface 512, and an enrolment kiosk 514 implementing an enrolment application 516.

The identity services framework comprises the reference table 210, as well as an event logging and reporting database 518, which for example stores event data used by the management reporting module 509.

The memory banks 506 include a biometric matching module comprising the common biometric database 208, storing the biometric samples, for example in the form of templates. The memory banks 506 also include a biographic database 520, for example storing personal details of record holders and optionally storing the biometric images, based on which the biometric templates may be generated. The memory banks 506 also include a service data block 522 comprising a lookup table linking biometric records to payment information, as will be described in more detail below.

The payment module 508 includes a number of applications supporting various payment schemes, in this example direct debit and prepaid payment schemes. The direct debit payment scheme involves the use of a financial administration package 524 that controls the execution of payment requests. Package 524 for example communicates with a direct debit collection module 526, allowing payments to be debited directly from a user bank account, and also with the collecting bank 528, which is the bank associated with the source apparatus that is to receive the funds. The direct connection (pre-paid) payment scheme involves the use of a direct connection collection module 534, that communicates with the acquiring bank 536 receiving the funds and with the issuing bank 538 supplying the funds from the account of the user.

Operation of the biometric identification system 200 of FIG. 5 will now described in more detail with reference to FIGS. 6A and 6B.

Figure 6A:
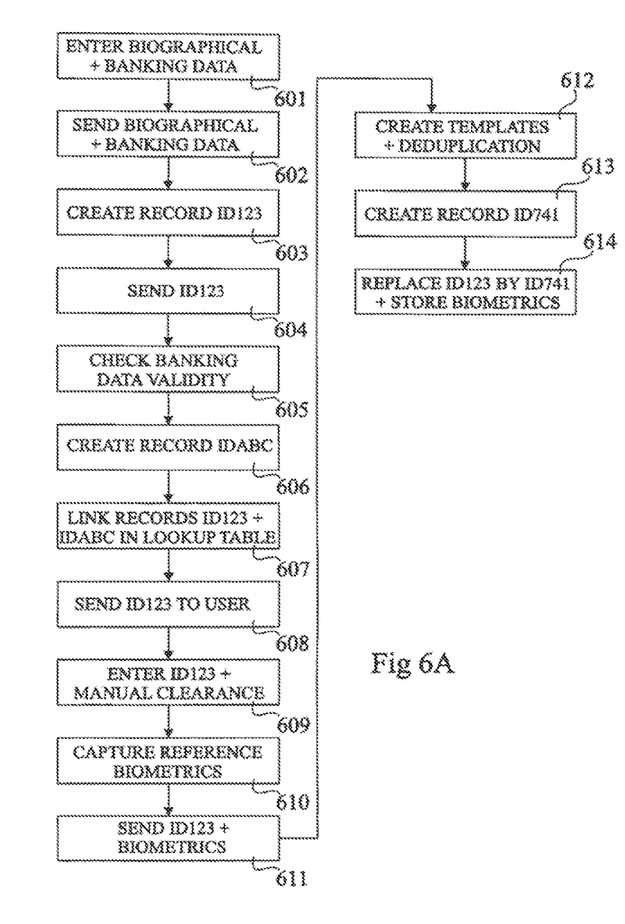
FIG. 6A is a flow diagram showing operations in a method of registering a new user of a biometric identification system.

FIG. 6A is a flow diagram showing an example of operations performed for registering a new user to use one or more of the source apparatuses 204A, 204B to access products or services.

In a first operation 601, a user enters biographical information and banking data, for example via an internet webpage using the customer support interface 512 of the pre-enrolment web portal 510 of FIG. 5. The user may also indicate the service or services that he/she wishes to be able to access using one or more biometric samples.

In a next operation 602, the data entered in operation 601 is sent to the biometric identification unit 202.

In a next operation 603, a record, for example having an identifier "ID123", is generated in the biographic database 520, and the users biographic data is stored in this record.

In a next operation 604, the record identifier "ID123 is sent to the payment module 508, where the banking data is verified, and a corresponding record is created containing the banking data, for example having the reference "IDABC".

In a next operation 607, the lookup table 522 is modified to link together identifiers "ID123" and "IDABC" as corresponding to a same user.

In a next operation 608, the identifier "ID 123" of the biographic record is sent to the user via the pre-enrolment web portal 510.

In a next operation 609, the user is for example invited to present himself/herself at the enrolment kiosk 514, where one or more biometric capturing devices is available. The identifier ID123 is entered, and the user's identity is for example manually verified based on one or more identity documents such as an ID card or passport.

In a next operation 610, one or more biometric reference samples of the user are captured, and transmitted in a subsequent operation 611 to the biometric identification unit 202.

In a next operation 612, templates are created and deduplication is performed. This step for example involves generating, based on the biometric image or images, templates for use during the subsequent biometric process. Deduplication then for example involves performing a matching process based on the new templates, and verifying that there are no high scoring records already in the database, which could indication that the same person has already been registered.

In a next operation 613, a new record, for example having an identifier "ID741", is created, and in a subsequent operation 614, the previously created record ID123 is replaced by record ID741, which additionally stores the captured reference biometrics. The lookup table 522 is updated accordingly. Such a manipulation of identifiers is for example performed to provide improved data privacy between databases of the matching system.

Figure 6B:
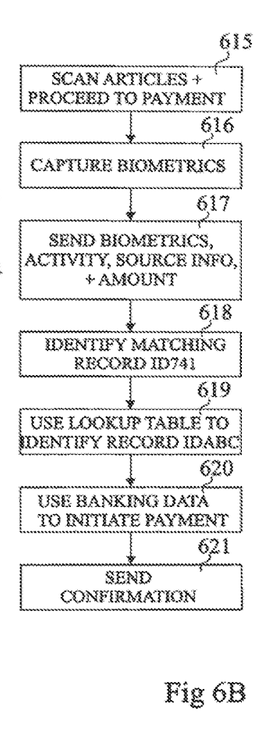
FIG. 6B is a flow diagram showing operations in a method of identifying the new user during a transaction according to example embodiments.

FIG. 6B is a flow diagram showing an example of subsequent operations for initiating and executing an identification request for a user, once the user has enrolled to use one or more source apparatuses.

In an operation 615, items in a shop or supermarket are scanned and the total bill is generated by the cashier terminal application 212A.

In a next operation 616, the customer opts to pay using biometric identification, and an input biometric sample is captured by the capturing device 206A.

In a next operation 617, the biometric sample, activity and source information, and the payment amount are transmitted to the biometric identification system. The activity information for example indicates that a payment is to be made, and the source information for example identifies the source apparatus or merchant.

In a next operation 618, a matching process is selected and performed, as described above with reference to FIG. 4. A matching record, in this example the record with identifier "ID741", is identified.

In a next operation 619, the lookup table 522 is used to identify the banking record associated with the user, in this example record IDABC.

In a next operation 620, the banking data associated with record IDABC is used to initiate a payment of the corresponding amount from the user to the bank account of the merchant, and in an operation 621 a confirmation is transmitted to the merchant that the payment has been authorised, such that the products can be released.

Figure 7:
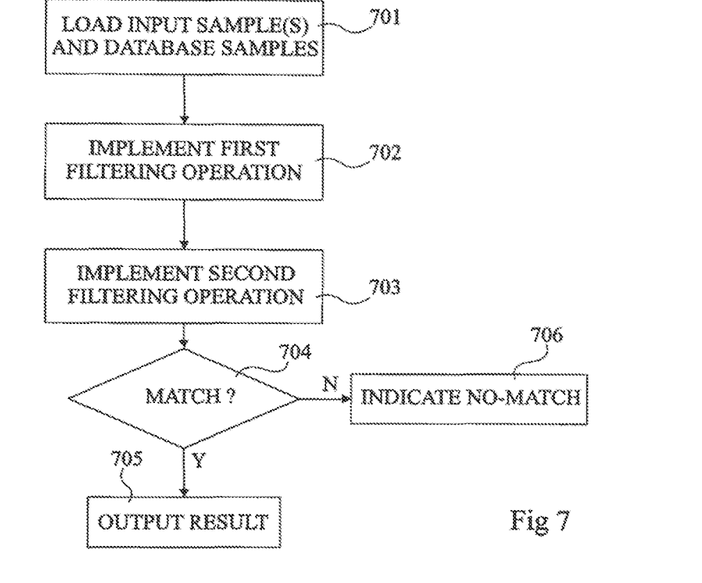
FIG. 7 is a flow diagram showing operations of a matching process according to an example embodiment.

FIG. 7 is a flow diagram showing examples of operations in a biometric matching process applied by the biometric identification unit 202 of FIG. 2A, which is for example implemented by the processing devices of FIG. 2B.

In an operation 701, the biometric identification unit 202 loads the input biometric sample and some or all of the reference biometric data samples ready for comparison. For example, the samples are loaded into a memory device of the biometric identification unit 202.

In a subsequent operation 702, a first filtering operation is used to filter the records associated with the identified source apparatus. This is achieved based on a comparison of the input biometric sample with a corresponding reference sample of each record, to filter out at least some of the records. The first filtering operation is for example chosen to filter out around 50 percent of the records very quickly and with relatively few false negatives. The filter is for example associated with a threshold that determines the records to be filtered in or filtered out, based on a similarity score determined for the record. A permissive threshold, for example relatively low, can be chosen such that a relatively high number of records are filtered in. A restrictive threshold, for example relatively high, can be chosen such that a relatively high number of records are filtered out. Generally, the threshold is chosen such that, while there may be a high likelihood that a non-matching record is filtered in, there is a very low risk that the matching record is erroneously filtered out during this operation.

As an example, assuming that during the first filtering operation a similarity score of the input biometric sample with each record is provided on a scale of 1 to 100, it may be determined that any record scoring less than 50 can be filtered out as it is very unlikely that such a low-scoring record corresponds to a match. Of course, it may be quite likely that a lot of non-matching records score over such a threshold, but the aim of the first filter is for example to reduce the number or records as much as possible.

In a subsequent operation 703, a second filtering operation is used to analyse the remaining records to identify, if present, the record with a matching biometric sample. The comparison performed in this operation may or not be based on the same input biometric sample as used in the first filtering operation 702. The second filtering operation is for example chosen to have very low false negative and false positive results, and is thus for example slower to execute per record than the first filtering operation. For example, this second filtering operation returns just one or a few of the best matching records. In one example, a similarity score determined in the second filtering operation is provided on a scale of 1 to 100, and a match is only considered if the record reaches a score of at least 90, which is for example known to be quite rare in the case of a non-matching record.

In a subsequent operation 704, it is determined whether or not a matching record has been identified. For example, in some embodiments, the second filtering operation 703 only indicates a match if there is relatively high certainty. In alternative embodiments, the second filtering operation 703 always outputs the best matching record, and also indicates the level of certainty that the record is a match, i.e. that the input biometric data sample came from the record holder. In such an embodiment, operation 704 may involve comparing the level of certainty with a threshold in order to judge whether there is a match. For example, a match is considered to have occurred if there is at least 99 percent certainty. Alternatively, the certainty level of the matching record from each database partition could be used to select the best matching record.

After operation 704, if a match was found from the partition being processed, the next operation is 705, in which this result is output. In particular, the score of each record is for example compared to a threshold score, and if this threshold is exceeded, the record is considered to be a match. If no record is found to have a score exceeding the threshold, then there will be no match. If more than one record is found to have a score exceeding the threshold, then an alert is for example generated, and a manual verification is performed.

The flow diagram of FIG. 7 provides just one example of a type of matching process that could be applied in order to find a record in the database 208 having one or more reference biometric samples matching one or more input biometric samples. There are various features of this process that can be modified to provide alternative matching processes, such as the particular filtering operations 702 and 703, the thresholds applied in the operation 702, and the type of biometric data sample compared in operations 702, 703, which could be the same or different. Furthermore, rather than the two-phase approach involving the first and second filtering operations, alternative matching processes could involve applying only the second filtering operation, or an additional filtering operations after the second filtering operation, the final filtering operation for example reducing the number of records to just one, or indicating the best matches. The particular matching process to be applied for an input biometric sample from a given source apparatus is determined by the reference table 210 described above.

The particular techniques used to compare the biometric samples and detect a match will be known to those skilled in the art, and are for example based on cascaded tests. For example, fingerprint and face recognition is discussed in the publication "Intelligent Biometric Techniques in Fingerprint and Face Recognition", Jain, L. C. et al and "Partially Parallel Architecture for AdaBoost-Based Detection With Haar-like Features", Hiromote et al., the contents of which are hereby incorporated by reference to the extent allowable by the law.

Figure 8A:
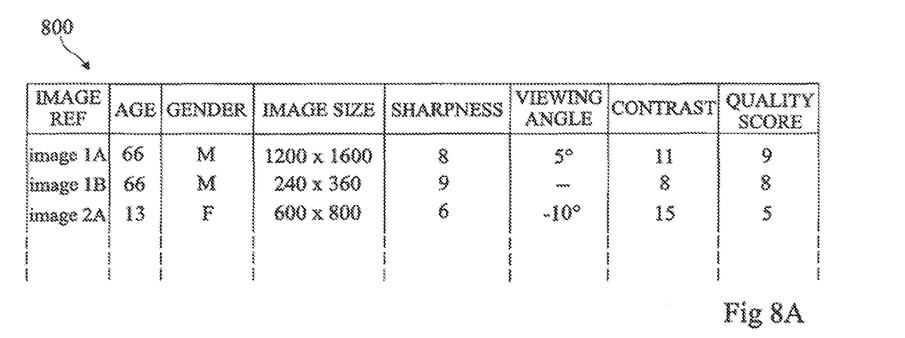
FIGS. 8A and 8B illustrate examples of extracted metadata according to an example embodiment.
Figure 8B:
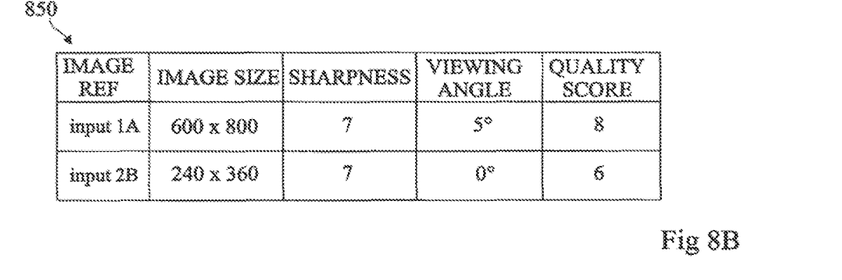

FIGS. 8A and 8B respectively illustrate examples of metadata extracted from database records and from biometric input samples, which are for example used to determine a quality value of either or both of the samples to be compared. Such a quality value is for used to determine a difficulty score, indicating the difficulty of accurately identifying a match or non-match for the pair of records.

With reference first to FIG. 8A, a table 800 shows in rows some examples of metadata that may be extracted from a few of the biometric reference samples of database portion 300 of FIG. 3. For example, for the photo of face "image1A" of record "0001", the metadata for example comprises the age and gender of the record holder, in this example having the respective values 66 and male. This information is for example obtained from the record holder.

Furthermore, data relating to the image may be extracted.

For example the image size may be extracted as the number of pixels in the rectangular image, which in the example of "image1A" is for example 1200 by 1600 pixels.

A sharpness level may be evaluated on a scale of 1 to 10 using techniques known to those skilled in the art, which in the example of "image1A" is equal to 8.

A viewing angle may be determined, a zero angle for example indicating that the face is head-on to the camera, a positive angle indicating a face turned to the right, and a negative angle indicating a face turned to the left. In the example of "image1A", the angle is for example 5 degrees.

A contrast level, for example on a scale of 1 to 20, may also be evaluated by techniques that will be known to those skilled in the art. In the example of "image1A", the value is 11.

It will be apparent to those skilled in the art that only some of these values, and/or additional values, could be extracted from the database samples. Furthermore, metadata indicating the particular types of biometric reference samples present in each record is for example extracted.

An overall quality score may be determined for each record, for example on a scale of 0 to 10, indicating an overall quality rating of the biometric sample based on the various parameters available. An example of this score is shown in the right-hand column of table 800.

With reference to FIG. 8B, a table 850 shows an example of metadata that could be extracted from two input biometric samples "input1A" and "input1B", which are for example a face image and a fingerprint respectively. In this example, the extracted metadata is for example the image size, the image sharpness, the viewing angle and an overall quality score, which are determined using the same criteria as described above in relation to FIG. 8A.

The difficulty score is for example evaluated for each input biometric sample, or for each comparison to be performed. As an example, if an input biometric sample is to be compared to 50 reference biometric samples of the biometric database, a difficulty score may be determined for each of these 50 comparisons based on a quality value of either or both of the samples that are compared. The quality score may be determined based any one or combination of the quality values shown in the columns of tables 800 and 850 of FIGS. 8A and 8B. In one example, a quality score of a pair of records is evaluated by multiplying the overall quality score for each record, or by subtracting one of the viewing angles from the other to determine a difference in the viewing angles.

The difficulty scores that have been determined may be used for billing purposes, and/or to adjust the thresholds used during the matching process such that a target performance can be achieved.

A feature of the example embodiments described herein is that, by selecting a matching process to be applied based on source information, the use of the processing resources of the biometric identification unit, and thus the processing time, may be optimized for each source apparatus.

While a number of specific embodiments of devices and methods of the present disclosure have been provided above, it will be apparent to those skilled in the art that various modifications and alternatives could be applied.

For example, it will be apparent to those skilled in the art that the examples of matching processes applied to the records are merely a few such examples, and that other matching processes could be used.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   receiving, by a biometric identification unit implemented at least partially in hardware, an input biometric sample,
      the input biometric sample originating from a source apparatus,
      the input biometric sample being received with source information indicating the source apparatus; and
   applying, by the biometric identification unit, a matching process to at least one biometric record of a plurality of biometric records of a database,
      the matching process being selected based on the source information.

2. The method of claim 1, where applying the matching process includes:
   applying the matching process to the at least one biometric record to determine whether the input biometric sample matches a reference biometric sample of the at least one biometric record.

3. The method of claim 1, further comprising:
   selecting the matching process using a data structure and based on the source information,
      where the data structure includes information identifying processing resources and information identifying matching processes associated with source apparatuses.

4. The method of claim 1, further comprising:
   determining, based on a data structure, processing resources associated with the matching process,
      where the data structure includes information identifying processing resources and information identifying matching processes associated with source apparatuses.

5. The method of claim 4, where the processing resources are based on matching operations of the matching process.

6. The method of claim 1, further comprising:
   assigning at least one of a priority level or a quantity of processors to the matching process based on the source information.

7. The method of claim 1, where the at least one biometric record includes information identifying an image of a face of an individual, information identifying an image of a fingerprint of the individual, information identifying a signature of the individual, and information identifying an image of an iris scan of the individual.

8. A non-transitory computer readable medium storing instructions, the instructions comprising:
   one or more instructions which, when executed by a biometric identification unit implemented at least partially in hardware, causes the biometric identification unit to:
      receive an input biometric sample,
         the input biometric sample originating from a source apparatus,
         the input biometric sample being received with source information indicating the source apparatus; and
      apply a matching process to at least one biometric record of a plurality of biometric records of a database,
         the matching process being selected based on the source information.

9. The non-transitory computer readable medium of claim 8, where the instructions further comprise:
   one or more instructions to cause the source apparatus to provide access to a product or a service based on applying the matching process.

10. The non-transitory computer readable medium of claim 8, where the at least one biometric record includes at least one of information identifying an image of a face of an individual, information identifying an image of a fingerprint of the individual, information identifying a signature of the individual, or information identifying an image of an iris scan of the individual.

11. The non-transitory computer readable medium of claim 8, where the instructions further comprise:
   one or more instructions to select the matching process using a data structure and based on the source information,
      where the data structure includes information identifying processing resources and information identifying matching processes associated with source apparatuses.

12. The non-transitory computer readable medium of claim 8, where the instructions further comprise:
   one or more instructions to assign at least one of a priority level or a quantity of processors to the matching process based on the source information.

13. The non-transitory computer readable medium of claim 8, where the instructions further comprise:
   one or more instructions to select the matching process using a data structure and based on the source information,
      where the data structure includes information identifying matching processes associated with source apparatuses.

14. The non-transitory computer readable medium of claim 8, where the instructions further comprise:
   one or more instructions to determine, based on a data structure, processing resources associated the matching process,
      where the data structure includes information identifying processing resources associated with source apparatuses.

15. A system comprising:
a biometric identification unit, implemented at least partially in hardware, to:
receive an input biometric sample,
the input biometric sample originating from a source apparatus,
the input biometric sample being received with source information indicating the source apparatus; and
apply a matching process to at least one biometric record of a plurality of biometric records of a database,
the matching process being selected based on the source information.

16. The system of claim 15, where the biometric identification unit is further to:
cause the source apparatus to provide access to a product or a service based on applying the matching process.

17. The system of claim 15, where, when applying the matching process, the biometric identification unit is to:
apply the matching process to the at least one biometric record to determine whether the input biometric sample matches a reference biometric sample of the at least one biometric record.

18. The system of claim 15, where the biometric identification unit is further to:
assign at least one of a priority level or a quantity of processors to the matching process based on the source information.

19. The system of claim 15, where the biometric identification unit is further to:
select the matching process using a data structure and based on the source information,
where the data structure includes information identifying matching processes associated with source apparatuses.

20. The system of claim 15, where the biometric identification unit is further to:
determine, based on a data structure, processing resources associated the matching process,
where the data structure includes information identifying processing resources associated with source apparatuses.

* * * * *